United States Patent [19]

Mottershead

[11] Patent Number: 4,551,032
[45] Date of Patent: Nov. 5, 1985

[54] MECHANISM FOR PRE-LOADING BEARINGS

[75] Inventor: Frank R. Mottershead, Birmingham, Mich.

[73] Assignee: The Cross Company, Fraser, Mich.

[21] Appl. No.: 631,194

[22] Filed: Jul. 16, 1984

[51] Int. Cl.$^4$ .................. F16C 33/58; F16C 43/04
[52] U.S. Cl. ........................... 384/517; 384/556
[58] Field of Search ............ 384/453, 556, 563, 490, 384/495, 500, 517, 518, 519

[56] References Cited

U.S. PATENT DOCUMENTS

| | | | |
|---|---|---|---|
| 2,314,622 | 3/1943 | Klamp | 384/517 |
| 2,556,368 | 6/1951 | Hegeman | 384/517 |
| 2,565,759 | 8/1951 | Danly | 384/556 |
| 3,222,991 | 12/1965 | Bone | 90/11 |
| 3,307,890 | 3/1967 | Johansson | 384/517 |
| 3,738,719 | 6/1973 | Langner | 384/517 |
| 4,023,868 | 5/1977 | Miki | 384/563 |
| 4,226,485 | 10/1980 | Pruvot | 308/207 R |
| 4,400,098 | 8/1983 | Lacey | 384/517 X |

Primary Examiner—Stuart S. Levy
Assistant Examiner—Thomas R. Hannon
Attorney, Agent, or Firm—James O. Skarsten

[57] ABSTRACT

Apparatus is provided for mounting a rotatable member such as a machine tool spindle within a bore provided in a housing, the rotatable member being journaled in a number of bearings. A bearing support sleeve disposed within the bore to support the bearings includes a first portion tightly fitted in the bore, a second portion slip-fitted in the bore and positioned to apply a pre-load force to the bearings, and a yieldable member joining the first and second portions. The pressure in a fluid system associated with the yieldable member is increased to deform the yieldable member and to thereby urge the second portion axially to apply a pre-load force to the bearings which corresponds to the pressure increase.

10 Claims, 3 Drawing Figures ived means

MECHANISM FOR PRE-LOADING BEARINGS

BACKGROUND OF THE INVENTION

The invention disclosed and claimed herein generally pertains to a mechanism of the type which employs fluid under pressure to selectively pre-load the bearings which support a machine tool spindle or like rotatable member. More particularly, the invention pertains to a mechanism of such type which allows the bearings to be axially displaced as they are pre-loaded, and at the same time prevents radial displacement of the bearings. Even more particularly, the invention pertains to a mechanism of such type which is greatly simplified over prior art devices, and which may include an improved means for sensing spindle thrust.

The importance of applying a proper amount of pre-load to the bearings which rotatably support a machine tool spindle, as the spindle drives a tool to perform a cutting operation upon a workpiece, is very well known in the machine tool arts. If a bearing pre-load is insufficient, there will be play or chatter in the spindle bearings, and the axis of the spindle will be able to deviate to some extent from the axial position required for true and accurate cutting. On the other hand, if bearing pre-load is too great during spindle operation, excessive heat may be generated, eventually causing the bearings to fail.

In certain currently available mechanisms for applying a variable pre-load to spindle bearings, the pressure of fluid in an associated fluid system is adjusted to vary the pre-load pressure on one race of the bearing. An important advantage of such mechanisms is that they enable spindle bearing pre-load to be adjusted with comparative simplicity to optimize spindle operation for different conditions. Thus, by corresponding adjustment of fluid pressure, bearing pre-load can be increased for operation of the spindle at low speed and high thrust, but can be decreased for high speed spindle operation to avoid generating excessive heat. However, present mechanisms of such type are often mechanically complex in that they require a number of pistons, plungers or other movable elements. In addition, in such mechanisms it has generally been necessary to allow a small amount of clearance between the bearings and the bore wall of the spindle housing, i.e., to provide a slip-fitting relationship between the bearings and the bore wall, as opposed to a close-fitting relationship. Such slip-fitting relationship is necessary to allow axial displacement of the bearings as fluid pressure is varied, so that the pre-load force can be transmitted to all of the bearings of the pre-load mechanism. However, if the spindle bearings are slip-fitted within the bore, the spindle supported by the bearings will be able to move radially during cutting operations, adversely affecting the accuracy or precision of cuts made upon workpieces by spindle-driven tools.

In the present invention, a mechanism is provided which has all the attendant advantages of conventional spindle bearing support mechanisms of the type which employ fluid under pressure to preload machine tool spindle bearings. The invention however, achieves a substantial simplification over various conventional mechanisms by eliminating the need for pistons or other moving parts which the conventional mechanisms tend to require. In addition, the invention is structured to radially stiffen the bearings and the spindle, to prevent deviation of the spindle axis from the axis position which is required to perform accurate cutting or machining operations upon workpieces. The invention is usefully structured to include a means for readily sensing spindle thrust during cutting operations.

SUMMARY OF THE INVENTION

The present invention provides a mechanism for mounting a spindle or other rotatable member within a bore which is provided in a housing, the mechanism including a unitary bearing support member disposed for insertion into the bore. The bearing support member is an integral structure which includes a first portion for radially stiffening the bearing support member within the bore, a second portion disposed for axial displacement within the bore, and a reduced wall section joining the first and second portions. The mechanism further includes first and second bearings which cooperate to journal the rotatable member in the bore, the first and second bearings being mounted upon the bearing support member in spaced-apart relationship. A supply of fluid under pressure is contained proximate to the reduced wall section of the bearing support member, the pressure of the fluid being varied by a selected amount to vary pressure applied to the wall section, and to thereby axially displace the second portion by a corresponding selected amount. Bearing constraint means cooperate with the displaceable second portion of the bearing support member to vary the pre-load applied to the first and second bearings by an amount which likewise corresponds to the selected fluid pressure variation.

Preferably, the bearing support means comprises a bearing support sleeve which is insertable into the bore so that the bearing support sleeve and the bore are in coaxial relationship. The first portion of the sleeve is disposed to fit tightly against a corresponding portion of the bore wall to prevent radial displacement of the sleeve within the bore and to thereby prevent radial displacement of the first and second bearings and of the spindle. Preferably also, an outwardly open and an inwardly open groove is formed in the bearing support member, the reduced wall section being positioned between the grooves, and the inwardly open groove being at atmospheric pressure and the outwardly open groove being filled with fluid of the supply. When fluid pressure is increased, the reduced wall section is urged toward the inwardly open groove, and transfers an axial force to the second component. The axial force is applied to the bearings by the second component to increase bearing pre-load in corresponding relationship with the increase in fluid pressure.

In a preferred embodiment of the invention, the first and second bearings comprise angular contact ball bearings, the outer race of the second bearing being in abutting relationship with the axially displaceable second portion of the bearing support sleeve and receiving a pre-load force therefrom which corresponds to the pressure level of the pressurized fluid. The races of the bearings are selectively mounted in relation to the spindle and the bearing support sleeve so that the bearings are pre-loaded by transmission of the force through the respective rolling elements of the bearings. In a useful modification of the invention, the bearing support sleeve has an integral forward portion which is also axially displaceable and is joined to the first portion by a second reduced sectional wall, so that the level of spindle thrust developed during a cutting operation may be transferred through the forward portion to an annular thrust sensor device which is in abutting relationship with the forward portion.

OBJECTS OF THE INVENTION

An object of the present invention is to simplify mechanisms for pre-loading the bearings which support a rotatable member, such as a machine tool spindle or the like, wherein bearing pre-load, is accomplished by varying the pressure of fluid in a pressurized fluid system associated with the mechanism.

Another object is to provide a mechanism of the above type which radially stiffens the bearings and the rotatable member so that the axis of the rotatable member remains precisely aligned along a particular desired axis.

Another object is to provide a system of the above type which includes improved means for detecting the level of forward thrust of the rotatable member.

These and other objects of the invention will become more readily apparent from the ensuing specification, when taken together with the drawings.

DETAILED DESCRIPTION OF THE PREFERRED EMBODIMENT

Figure 1:
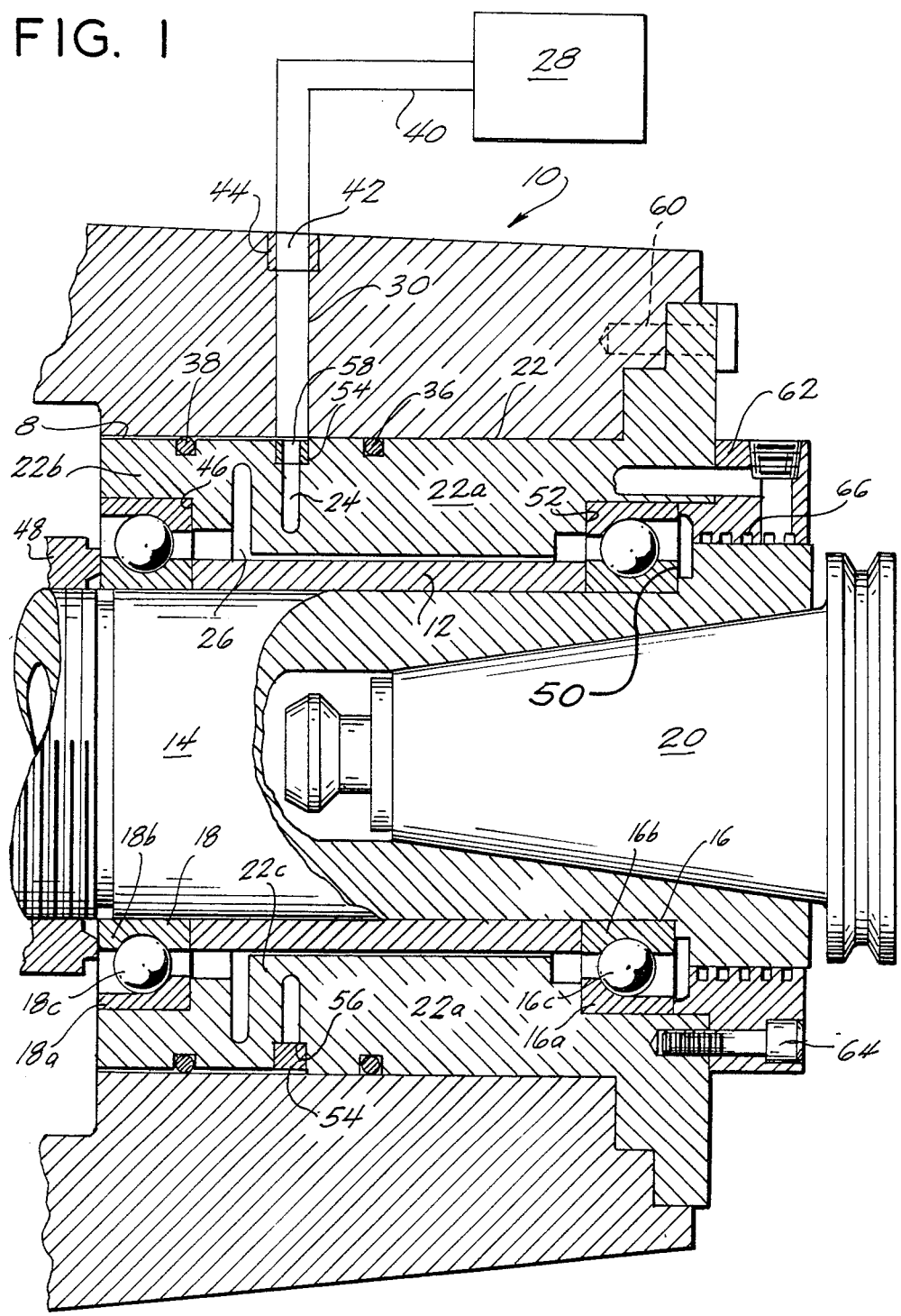
FIG. 1 is a longitudinal sectional view showing an embodiment of the invention in working relationship with a machine tool spindle.

Referring to FIG. 1, there is shown a bore 8 formed in a machine tool housing 10. A spindle 14 of conventional design is rotatably mounted within bore 8, by means of a forward bearing 16 and a rearward bearing 18, to drive a rotatable cutting tool (not shown). Usefully, the cutting tool is of a type which is receivable into a conventional toolholder 20, which may be locked to spindle 14 for rotation in unison therewith.

Spindle bearings 16 and 18 are provided with outer races 16a and 18a, inner races 16b and 18b, and rolling elements 16c and 18a, respectively. Inner races 16b and 18b are separated by means of a spacer 12, fitted around spindle 14. Bearings 16 and 18 comprise a type of bearing, such as a roller contact ball bearing, wherein an axial force applied to one of the bearing races is transmitted through the bearing roller elements to apply an axial force to the other bearing race.

Spindle bearings 16 and 18 are mounted within the bore of a sleeve 22 which, in turn, is fixed within the bore 8. To this end, sleeve 22 is provided with a portion 22a having an outer diameter which is in tight engagement with the wall of bore 8. By providing such tight or close-fitting relationship between the bore wall and portion 22a, portion 22a acts to radially stiffen sleeve 22, spindle 14, and spindle bearings 16 and 18. Thus, spindle 14 and rotary cutting tools driven thereby are maintained in precise coaxial relationship with bore 8 during machining operations. Moreover, the close-fitting relationship between sleeve portion 22a and the bore wall prevents axial movement of portion 22a within the bore.

Referring further to FIG. 1, there is shown a portion 22b of sleeve 22 which is dimensioned to be in slip-fitting relationship with the bore wall when sleeve 22 is inserted into bore 8. That is, an amount of clearance space is allowed between sleeve portion 22b and the bore wall so that sleeve portion 22b can be displaced axially within the bore. Portions 22a and 22b are joined to one another by means of a reduced wall section 22c. It is to be emphasized that portions 22a, 22b and 22c are all integral parts of sleeve 22. An annular groove 24 is formed in sleeve 22 between portion 22a and reduced wall section 22c, and an annular groove 26 is formed therein between portion 22b and the reduced wall section. Groove 24 opens outwardly, that is, outward from the interior of bore 8, and groove 24 opens inwardly, that is, in toward the interior of bore 8. Groove 26 is under atmospheric pressure, or otherwise unpressurized, while groove 24 is filled with hydraulic fluid and is in communication with a hydraulic circuit or the like 28, hereinafter described, through a passage 30 formed in housing 10. By selective operation of hydraulic circuit 28, the pressure of the hydraulic fluid contained in groove 24 may be controllably varied. To prevent the fluid from escaping through any clearance space existing between bore wall 12 and the outer circumference of compliant portion 22b, O-rings 36 and 38 are sealably positioned between the bore wall and sleeve 22, O-ring 36 being positioned to the right of grooves 24 and 26, and O-ring 38 being positioned to the left thereof, as viewed in FIG. 1. Usefully, hydraulic circuit 28 is coupled to passage 30 through a fluid line 40 having its end coupled to a port 42 formed in housing 10. A sealing member 44 is placed within passage 30, adjacent to the port, to prevent fluid leakage.

If the pressure of the hydraulic fluid is initially such that axially displaceable portion 22b and wall section 22c are at specified reference positions, for example, at their respective relaxed positions, and if fluid pressure is then selectively increased, the fluid contained in groove 24 tends to act against immovable portion 22a to urge wall section 22c toward inwardly open groove 26. Since groove 26 is only at atmospheric pressure, wall section 22c is enabled to yield slightly in response to the increased fluid pressure, and to transfer an axial force component to portion 22b, the axial force component corresponding to the selected increase in fluid pressure. Since portion 22b is slip-fitted in bore 8, the coaxial force component causes portion 22b to be displaced slightly to the left, as viewed in FIG. 1, so as to apply the coaxial force component to outer bearing race 18a, through an annular face 46 of portion 22b which abuts bearing race 18a. The coaxial force applied to race 18a is transmitted through bearing roller elements 18c to inner race 18b, whereby inner race 18b is urged against an annular member 48, which may be a nut tightened around spindle 14 against race 18b to back races 16b and 18b in abutment against spacer 12.

Spindle 14 is displaceable slightly along its axis. Therefore, the axial force applied to member 48 by inner race 18a is applied to inner race 16b through an annular shoulder 50 formed in spindle 14, is transmitted to outer bearing race 16a through roller elements 16c, and is taken up by annular shoulder 52 of immovable portion 22a. Thus, as portion 22b is urged leftward by increased fluid pressure, bearings 16 and 18 are pre-loaded between annular faces 46 and 52 of portions 22b and 22a, respectively, by a force acting through spindle 14. Such pre-load force bears a corresponding relationship to the increase in pressure.

In some instances, it may be desirable to place a level of static pre-load upon bearings 16 and 18, in addition to the pre-load which is placed thereupon by the pressure level of fluid 32 within groove 24. Such static pre-load may be established by locating a split ring 54 upon an annular seat 56 which is formed in groove 24. The width of ring 54 is selected so that it can be seated only by forcing reduced wall section 22c toward inwardly open groove 26, so that a coaxial force is applied to portion 22b. Such coaxial force urges portion 22b to the left, as viewed in FIG. 1, to pre-load bearings 16 and 18 as previously described in regard to increased fluid pressure. It will be readily apparent that the level of static pre-load will be increased as the width selected for a ring 54 is increased. FIG. 1 shows split ring 54 traversed by a through hole 58, which is aligned with passage 30 so that the fluid contained in groove 24 remains in communication with hydraulic circuit 28.

FIG. 1 shows the forward-most portion of sleeve 22 joined to housing 10 by means of bolts 60 or the like, and further shows an annular bearing retainer cap 62 joined to sleeve 22 by means of bolts 64. Retainer cap 62 surrounds spindle 14 in close, spaced-apart relationship. An air-operated labyrinth seal 66 of conventional design is usefully positioned within the space between retainer cap 62 and spindle 14 to prevent entrance of foreign material.

Figure 2:
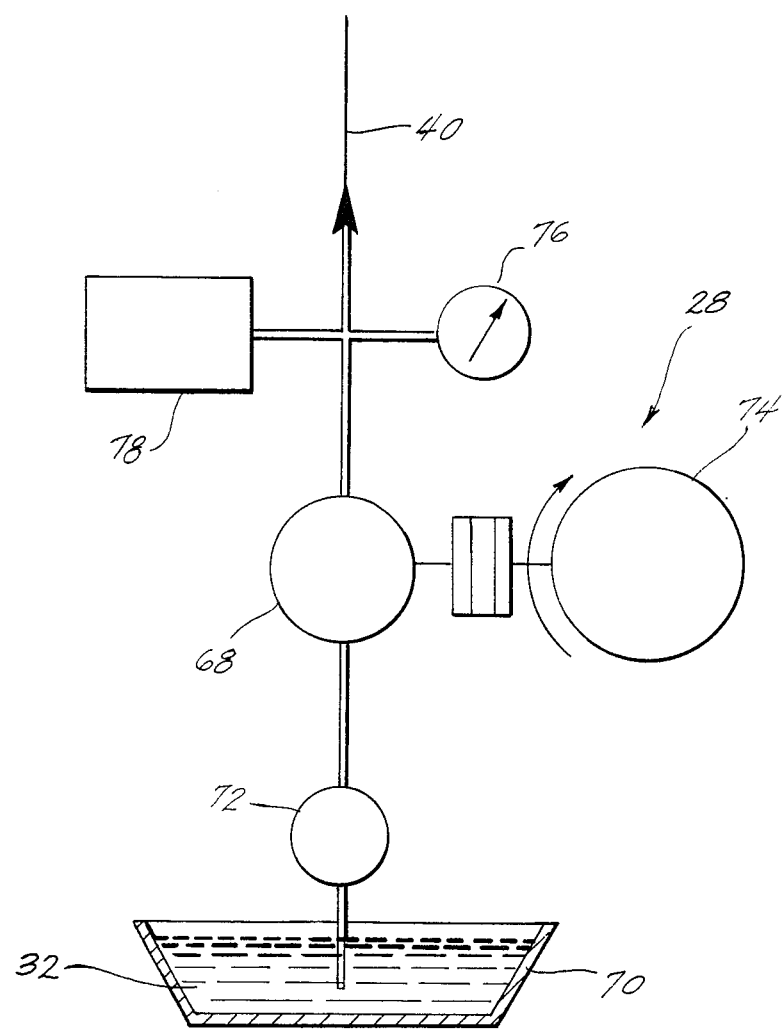
FIG. 2 is a schematic diagram of a hydraulic circuit for use with the embodiment of FIG. 1.

Referring to FIG. 2, there is shown hydraulic circuit 28 provided with a pump 68 having an output coupled to hydraulic fluid line 40, and an input coupled to a reservoir 70 containing hydraulic fluid 32 through a filter 72. Pump 68 is operated by a motor 74 to provide a selected level of fluid pressure within line 40. A particular level, within a range of pressure levels, is selected by operation of a pressure regulator 78 coupled to line 40. A pressure gauge 76 is also coupled thereto.

It is to be emphasized that the hydraulic circuit 28 shown in FIG. 2 is intended to represent only one of a number of conventional devices which may be available to controllably vary the pressure in hydraulic line 40. It is anticipated that other of such devices could be used for pressure variation without departing in any way from the spirit and intent of applicant's invention.

Figure 3:
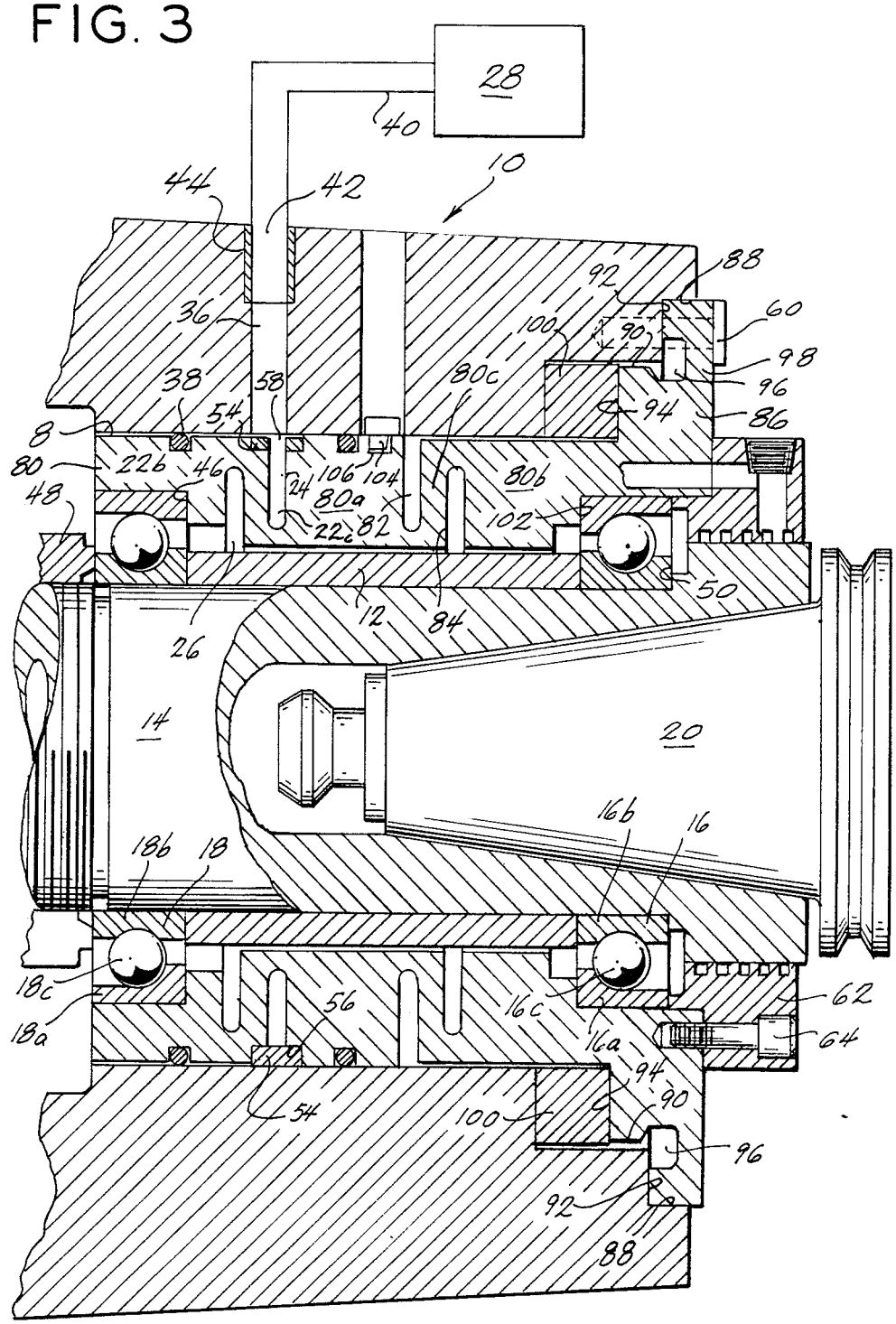
FIG. 3 is a longitudinal sectional view showing a modification of the embodiment of FIG. 1.

Referring to FIG. 3, there are shown a number of elements which are also shown in FIG. 1, and which cooperate with one another, as hereinbefore described in conjunction with FIG. 1, to pre-load spindle bearings 16 and 18 in corresponding relationship with the pressure level of fluid contained in groove 24. In particular, FIG. 3 shows a bearing support sleeve 80 which comprises an integral structure, and which includes an axially displaceable portion 22b and a reduced wall section 22c. Portion 22b and wall section 22c operate in the same manner and perform the same functions as portions 22b and 22c, respectively, of bearing support sleeve 22. In addition, bearing sleeve 80 includes a portion 80a which is joined to portion 22b by means of wall section 22c, and which is in very tight, close-fitting relationship with the wall of bore 8 when sleeve 80 is inserted into the bore. Consequently, close-fitting portion 80a is not displaced axially along the bore, and serves to radially stiffen spindle 14 and bearings 16 and 18 within the bore.

FIG. 3 further shows sleeve 80 provided with a portion 80b which is insertable into bore 8 in slip-fitting relationship with the bore wall, in like manner as portion 22b. That is, an amount of clearance space is allowed between sleeve portion 80b and the bore wall so that sleeve portion 80b is displaceable with respect to the bore wall. Portions 80a and 80b are joined to one another by means of a reduced wall section 80c. Referring further to FIG. 3, there is shown an annular groove 82 formed in sleeve 80 between portion 80a and reduced wall section 80c, and an annular groove 84 formed therein between portion 80b and reduced wall section 80c. Groove 82 opens outwardly, that is, outward from the interior of bore 8, and groove 84 opens inwardly, that is, in toward the interior of bore 8. Grooves 82 and 84 are both under atmospheric pressure, or are otherwise unpressurized. A flange 86 is formed in portion 80b, which is provided with annular edges 88 and 90 and with annular faces 92 and 94.

To provide further radial stiffening for bearings 16 and 18 and spindle 14, edge 88 of flange 86 is closely fitted into housing 10. However, a groove or relief 96 is provided in flange 86, to form a yieldable reduced wall section 98. Also, edge 90 is in slip-fitting relationship with housing 10. Annular face 92 abuts an annular shoulder formed in housing 10, and face 94 is in abutting relationship with an annular thrust sensing device 100, comprising a conventional device such as a piezo-electric force transducer, or strain guage. When face 94 is urged against sensing device 100 with a particular level of force or thrust, device 100 generates a signal representative of such force or thrust.

When a tool held by toolholder 20 is fed into a workpiece, spindle 14 experiences a level of thrust which tends to urge the spindle to the left, as viewed in FIG. 3. An axial force component representing such thrust is applied to inner race 16b, through annular shoulder 50, and is transmitted to outer race 16a through roller elements 16c. Outer race 16a applies the axial force component to portion 80b of sleeve 80, through an annular shoulder 102 formed in sleeve 80 which is in abutting relationship with race 16a. As afore-stated, portion 80b is in slip-fitting relationship with the wall of bore 8. Consequently, the axial force applied to portion 80b through annular shoulder 102 is not taken up by friction between portion 80b and the bore wall. Also, reduced wall section 80c, positioned between portions 80a and 80b, is yieldable to leftward displacement of portion 80b, so that the axial force is not taken up by immovable portion 80a. Finally, by forming yieldable wall section 98 in sleeve 80, the axial force is not taken up by either edge 88 or face 92 acting against housing 10. Rather, the axial force component is taken up by sensing device 100, through face 94, as the axial force urges portion 80b leftward. The signal generated by device 100 in response to such force component can readily be coupled to operate a gauge or other read-out device (not shown) to indicate the axial thrust which is experienced by spindle 14 and a tool driven thereby during a machining operation.

In the embodiment of applicant's invention which is shown in FIG. 1, the axial force upon sleeve portion 22b which results from increased fluid pressure, and which acts against outer race 18a, is taken up by close-fitting sleeve portion 22a, as previously described, to pre-load bearings 16 and 18. However, in the modification of the invention shown in FIG. 3, the pre-load force is transmitted to portion 80b from outer race 16a, through shoulder 102. Such force tends to move portion 80b to the left, and is therefore taken up by sensing device 100, in like manner as the thrust force applied to portion 80b through race 16b.

In the modification of FIG. 3, a desired preload is established by seating a split ring 54 and/or by operating hydraulic circuit 28. After the preload has been established, the read-out device may be re-zeroed, and a thrust reading may then be taken. By following such procedure, pre-load force taken up by sensing device 100 will not be misinterpreted as a component of thrust load.

In some instances, it may be important to guard spindle 14 against excessive amounts of back thrust. Thus, FIG. 3 shows a key 104, rigidly secured to housing 10, inserted into a slot or keyway 106 provided in sleeve 80 so that key 104 and keyway 106 are in axially slidable relationship. The length of keyway 104 is selected to prevent spindle 14 from traveling to the right, as viewed in FIG. 3, by more than a specified amount relative to housing 10. It is to be noted that, in providing split ring 54 around the opening of groove 24, back thrust will be taken solidly through sleeve 80. Also, key 104 prevents portion 80a from slipping rightward in response to an increase in hydraulic fluid pressure.

Obviously, many other modifications and variations of the present invention are possible in the light of the above teachings. It is therefore understood that within the scope of the disclosed inventive concept, the invention may be practiced otherwise than as specifically described.

What is claimed is:

1. A mechanism of a type comprising a bearing (18) for rotatably mounting a first machine tool member (14) and means (22,28) for pre-loading the bearing (18) and supporting the bearing (18) and first machine tool member (14) with respect to a second machine tool member (10), said means characterized by:
   a sleeve (22) having a first portion (22a) held in immovable relationship by said second member (10), a second portion (22b) carrying said bearing (18) and displaceable along the axis of said sleeve, and a portion (22c) interconnecting said first and second sleeve portions and displaceable along the axis of said sleeve; and
   means (28) for controllably urging said interconnecting portion (22c), said second portion (22b) and said bearing (18) away from said first portion (22a) to selectively increase the pre-load applied to said bearing (18).

2. The mechanism of claim 1 wherein:
   said interconnecting portion (22c) is spaced apart from said first sleeve portion (22a) to form a reservoir (24) in said sleeve (22) for a fluid;
   said mechanism includes means (48) for resisting displacement of said bearing (18) along the axis of said sleeve (22) and away from said first sleeve portion (22a); and
   said urging means comprises a fluid contained in said reservoir (24) in said sleeve, means (36,38) for sealing said fluid in said reservoir, and means (28) for increasing the pressure of said fluid in said reservoir (24) to urge said bearing (18) away from said first sleeve portion (22a) and against said resisting means (48) to increase the pre-load applied to said bearing (18) as a function of said increased pressure.

3. The mechanism of claim 2 wherein:
   said interconnecting portion (22c) comprises a wall member (22c) spaced apart from said first sleeve portion (22a) by a first annular groove (24) formed in said sleeve (22), and from said second sleeve portion (22c) by a second annular groove (26) formed in said sleeve (22), said first annular groove (24) comprising said reservoir and containing said fluid and said second annular groove (26) containing air at atmospheric pressure; and
   said fluid comprises an incompressible fluid.

4. The mechanism of claim 3 wherein:
   said first (24) and second (26) annular grooves open in opposite directions.

5. The mechanism of claim 3 wherein:
   said second machine tool member (10) comprises a housing (10) provided with a bore (8) for receiving said sleeve (22), said bearing (18) and said first member (14);
   said first annular groove (24) opens toward the wall of said bore (8); and
   said sealing means comprises first (36) and second (38) O-rings positioned between said wall of said bore and said sleeve on opposing sides of said first annular groove (24).

6. The mechanism of claim 5 wherein:
   said means for increasing fluid pressure comprises a source (28) of hydraulic pressure in communication with fluid in said first annular groove (24) through a passage (30) formed in said housing (10).

7. The mechanism of claim 5 wherein: said first sleeve portion (22a) is tightly fitted in said bore to prevent axial and radial movement of said first sleeve portion (22a) with respect to said bore; and
   said second sleeve portion is fitted in said bore (8) to allow axial displacement of said second sleeve portion (22b) with respect to said bore (8).

8. Apparatus for mounting a machine tool spindle in a bore provided in a housing, said apparatus comprising:
   a bearing support sleeve disposed within said housing which comprises a first portion tightly fitted within said bore, second and third portions disposed for axial displacement within said bore, and first and second yieldable members respectively joining said first portion and said second portion, and said first portion and said third portion;
   sensing means abutting said third portion for taking up an axial force urging said third portion toward said sensing means, and for generating a signal representing said axial force;
   first and second bearings having their inner races locked to said spindle for axial displacement therewith, the outer race of said first bearing positioned to be urged axially by said second portion and the outer race of said second bearing positioned to urge said third portion axially against said sensing means, said first and second bearings each being of a type wherein an axial force applied to one of the bearing races is transmitted to the other; and
   a system of fluid under pressure for selectively deforming said first yieldable member to urge said second portion and the outer race of said first bearing axially, and thus pre-load said first and second bearings against said sensing means and through said spindle and said third portion.

9. The apparatus of claim 8 wherein:
   said second portion comprises a rearward portion of said sleeve, and said third portion comprises a forward portion of said sleeve; and
   said forward portion includes a flange having an edge tightly fitted within said bore, a relief being placed in said flange to form a third yieldable member.

10. The apparatus of claim 9 wherein:
    a first annular groove containing fluid of said system is formed in said sleeve between said first yieldable member and said first portion of said sleeve, an annular seat being formed in said first annular groove;

a second annular groove at atmospheric pressure is formed in said sleeve between said first yieldable member and said rearward portion of said sleeve;

said fluid system includes means for selectively increasing the pressure of said fluid contained in said annular groove to apply a pre-load to said bearings corresponding to said pressure increase;

a split ring of specified width is located on said seat to apply a static pre-load to said bearings corresponding to said width; and a key and corresponding keyway are positioned between said sleeve and said housing to take up back thrust applied to said spindle, and to prevent forward movement of said first portion within said bore.

* * * * *